United States Patent [19]
Ricci

[11] Patent Number: 5,887,501
[45] Date of Patent: Mar. 30, 1999

[54] END PREP FACING MACHINE

[76] Inventor: Donato L. Ricci, W8477—162nd Ave., Hager City, Wis. 54014

[21] Appl. No.: 13,389

[22] Filed: Jan. 26, 1998

[51] Int. Cl.$^6$ .................................................. B23B 5/00
[52] U.S. Cl. .............................. 82/123; 82/113; 82/1.2; 82/128
[58] Field of Search ............................... 82/113, 1.2, 82, 82/83, 84, 92, 100, 128, 123

[56] References Cited

U.S. PATENT DOCUMENTS

| | | | |
|---|---|---|---|
| 4,677,884 | 7/1987 | Kwech et al. ............................ | 82/4 C |
| 4,852,435 | 8/1989 | Hunt ........................................ | 82/113 |
| 4,854,200 | 8/1989 | Mynhier ................................... | 82/113 |
| 5,557,995 | 9/1996 | Robinson ................................. | 82/113 |
| 5,603,250 | 2/1997 | Robinson ................................. | 82/113 |
| 5,630,346 | 5/1997 | Strait . | |
| 5,725,724 | 3/1998 | Andrew et al. ......................... | 156/535 |
| 5,836,727 | 11/1998 | Scheer ..................................... | 82/113 |

Primary Examiner—Andrea L. Pitts
Assistant Examiner—Mark Williams
Attorney, Agent, or Firm—Nikolai, Mersereau & Dietz, P.A.

[57] ABSTRACT

A portable end prep facer for refurbishing piping components in the field comprises a chuck to which a cylindrical mandrel is affixed where the chuck can be centrally mounted relative to a longitudinal axis of the piping component by affixing the chuck either to the I.D. or the O.D. of the piping component. A non-rotatable torque housing surrounds the mandrel and is longitudinally positionable there along. A cutting head assembly is journaled for rotation about the mandrel by means of bearings mounted in the torque housing and coapting with an annular race formed in a face plate of the cutting head assembly. Mounted on the face plate is a variable speed reversing drive mechanism that couples to a lead screw that forms a part of a tool support guide member. A sliding head is affixed to the lead screw and it, in turn, supports a tool bit holder that can be manually adjusted to set the depth of cut when machining the flange portion of a piping component being repaired.

20 Claims, 15 Drawing Sheets

END PREP FACING MACHINE

BACKGROUND OF THE INVENTION

I. Field of the Invention

This invention relates generally to portable, on-site metal machining equipment, and more particularly to an apparatus that can be mounted on a piping component for machining a surface of that component.

II. Discussion of the Prior Art

Oil refineries, chemical processing plants, pipeline companies and power plants typically provide fluid handling through piping systems where adjacent piping components are connected together by running bolts through mating flanges thereof. Such piping components may include straight pipe sections, elbows, nozzles, reducers, valves, etc. These components are typically subjected to fluids under high pressure, high temperatures, adverse atmospheric conditions, and having corrosive properties. Over time, such piping components may develop leaks due to scoring, warpage, and metal erosion, especially on flange faces. When this happens, it is necessary to machine the flange faces to remove grooves due to scoring and to restore a true flat surface to the flange meeting the original specifications for the pipe segments. Flanges on large diameter pipes also will include an annular groove having tapered side walls for receiving a metal seal ring therein. These grooves are also subject to wear and periodically need to be machined to insure seal integrity. Flanged pipes may also require internal diameter boring and outside diameter turning operations in the filed.

When it is considered that in many industrial installations, the piping components may vary anywhere from about 30 inches to 120 inches in diameter and may weigh several tons, it is impractical to transport such pipe components to a machine shop facility for refurbishment. Accordingly, a need exists for a machine for refacing flanges of piping components in the field.

In the Hunt Patent, U.S. Pat. No. 4,852,435, there is disclosed a portable machining tool for refacing or regrooving pipe flanges. It comprises a chuck that is adapted to be mounted within the bore of the pipe component to be refurbished. The chuck supports a machine body that is motor driven so as to rotate about an axis that is aligned with the center of the chuck. Mounted on the machine body is a tool bar that is fed in a direction transverse to the longitudinal axis of the pipe in which the chuck is mounted and it carries a cutting tool for engaging the surface of the flange being refaced so as to remove metal as the tool bar is being fed across the face of the flange.

Another portable flange facer adapted for use in the field is available from the Climax Machine Tool Company of Newberg, Oreg., and which is more particularly described in the Strait Patent, U.S. Pat. No. 5,630,346. With reference to that patent, its tool bar 200 feeds radially in and out. This presents a problem when working in confined spaces. More importantly, the feed system depicted in FIGS. 4, 5 and 6 of the '346 patent does not provide continuous feed. Instead, the feed stops and starts with each actuation of the cams 100A and 100B on the rocker arms 152A and 152B. This tends to leave an uneven surface finish. Such a condition is not acceptable in certain flange sealing applications.

The prior art devices suffer from a number of other drawbacks that limit its capabilities. For example, in the Strait '346 patent, the tool base 234 cannot swivel and, hence, the cutting tool 254 cannot be used for cutting angled grooves when desired.

It is sometimes advantageous to mount the chuck to the inside diameter of the pipe component whose flange is to be refaced. In other applications, it is advantageous to affix the chuck to the perimeter of the flange itself. No provision is made in the prior art for allowing one or the other of these two mounting modes. The device described in the Hunt '435 patent suffers from a number of operational deficiencies. First of all, there are no mitering capabilities in the chuck assembly, making setup and centering somewhat difficult. Moreover, there is no provision for translating the rotatable main body 70 relative to the spindle 10. In terms of performance, the feed resulting from the use of the feed cam 94 on the cam follower 96 results in an inferior surface finish due to the inherent lurching involved. Further, there is no provision in the Hunt machine for adjustment of the rotational bearing 72 following a period of use and resulting wear. Furthermore, it is not possible to reverse the feed direction without first removing and reversing the position of the feed slave unit 110.

It is, therefore, desirable to have an end prep facer for refurbishing piping components that obviates the aforementioned problems inherent in prior art machines used for this purpose.

SUMMARY OF THE INVENTION

In accordance with a first feature of the present invention, there is provided an end prep facer for refurbishing piping components that comprises a chuck having a plurality of equally spaced, radially extending legs of adjustable length that are adapted to support the chuck at a center point of a tubular piping component to be refurbished. A cylindrical mandrel of a predetermined outer diameter is affixed to the chuck with a miter connection that allows limited skewing of the mandrel relative to the chuck at the time of setup. The end prep facer further comprises a torque housing having a cylindrical tube with an inner diameter slightly greater than the predetermined outer diameter of the mandrel and the cylindrical tube of the torque housing is mounted in concentric relation on the mandrel for longitudinal displacement there along. The torque housing has a radial flange portion and a plurality of cylindrical, longitudinal bores are formed in a face of the flange portion at uniformly spaced circumferential intervals proximate the periphery of the flange portion to accommodate the insertion of roller bearings in those bores. A first ring gear is affixed to the face of the flange portion and is concentric with the aforementioned cylindrical tube. A manually operable feed screw is operatively coupled between the mandrel and the torque housing so as to allow adjustment of the position of the torque housing along the longitudinal axis of the mandrel. A cutting head assembly having an annular face plate with first and second major surfaces is also disposed about the mandrel and is supported by the roller bearings affixed to the flange portion of the torque housing. More particularly, the annular face plate of the cutting head assembly has an annular bearing race formed in the first major surface thereof for engaging the roller bearings of the torque housing. A second ring gear which is concentrically mounted with respect to the bearing race is also secured to the first major surface of the annular face plate. Affixed to the second major surface of the face plate is a right angled drive device having a drive gear that meshes with the first ring gear and whose output shaft is coupled to an input shaft of a variable speed gear box assembly bolted to the second major surface of the face plate. The variable speed gear box, in turn, has an output shaft that drives a reversing differential gear box. A drive motor, either electric or hydraulic, is mounted on the torque housing such that a driving gear on that motor's output shaft engages the second ring gear for rotating the cutting head assembly relative to the torque housing assembly about the mandrel as a center. Finally, there is affixed to the second major surface of the annular face plate of the cutting head assembly a tool support guide member that has a lead screw mounted thereon. The lead screw is operatively coupled so as to be driven by the output shaft of the reversing differential gear box. Affixed to the lead screw is a sliding head member that is movable therewith in a direction transverse to the longitudinal axis of the mandrel. The sliding head member supports a tool bit holder capable of being swiveled relative to the sliding head member and which can be manually actuated to establish the depth of cut of a tool bit relative to the surface being refaced.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
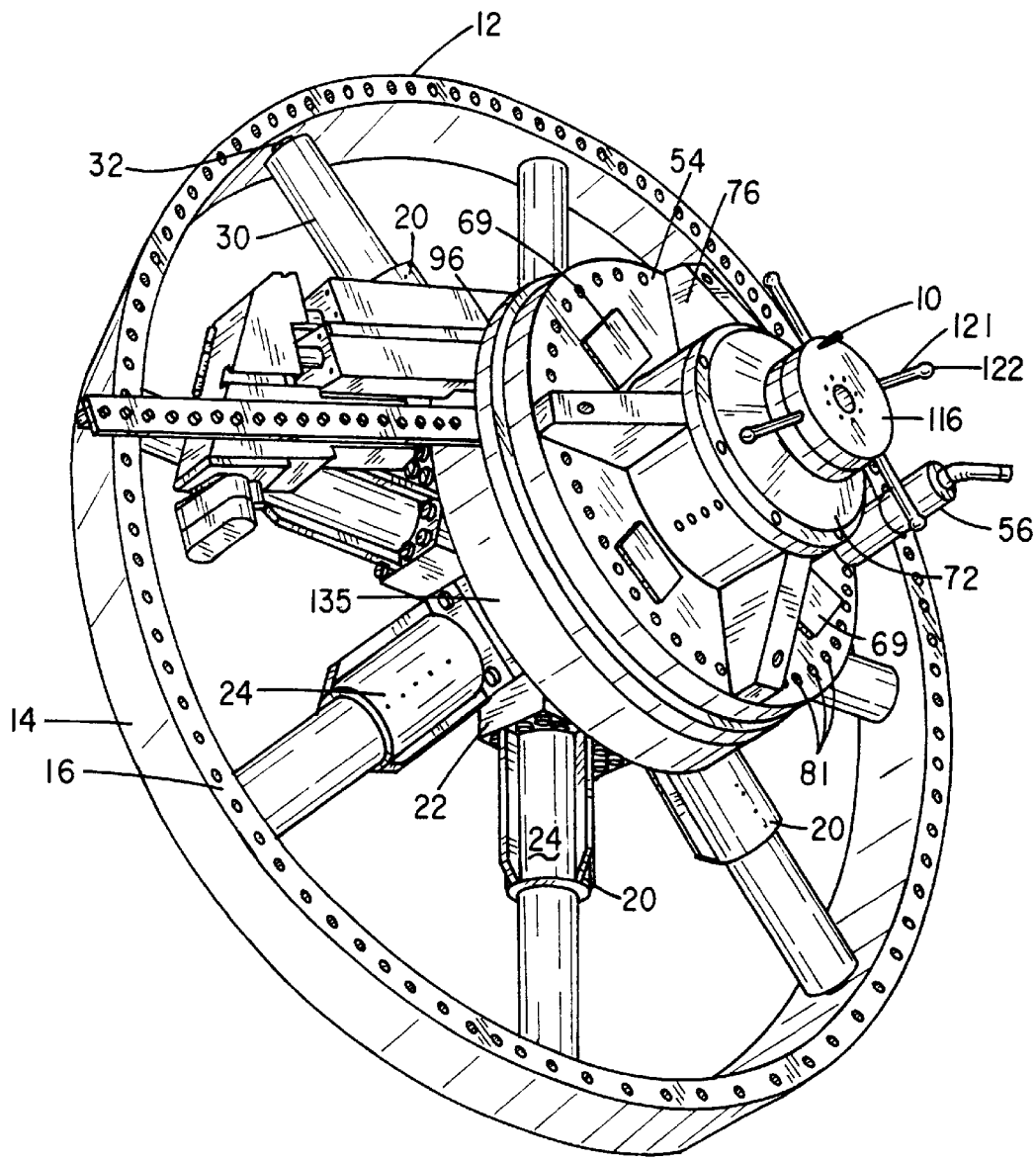
FIG. 1 is a perspective view of the end prep facer of the present invention mounted to the internal diameter of a pipe component to be refurbished.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Figure 3:
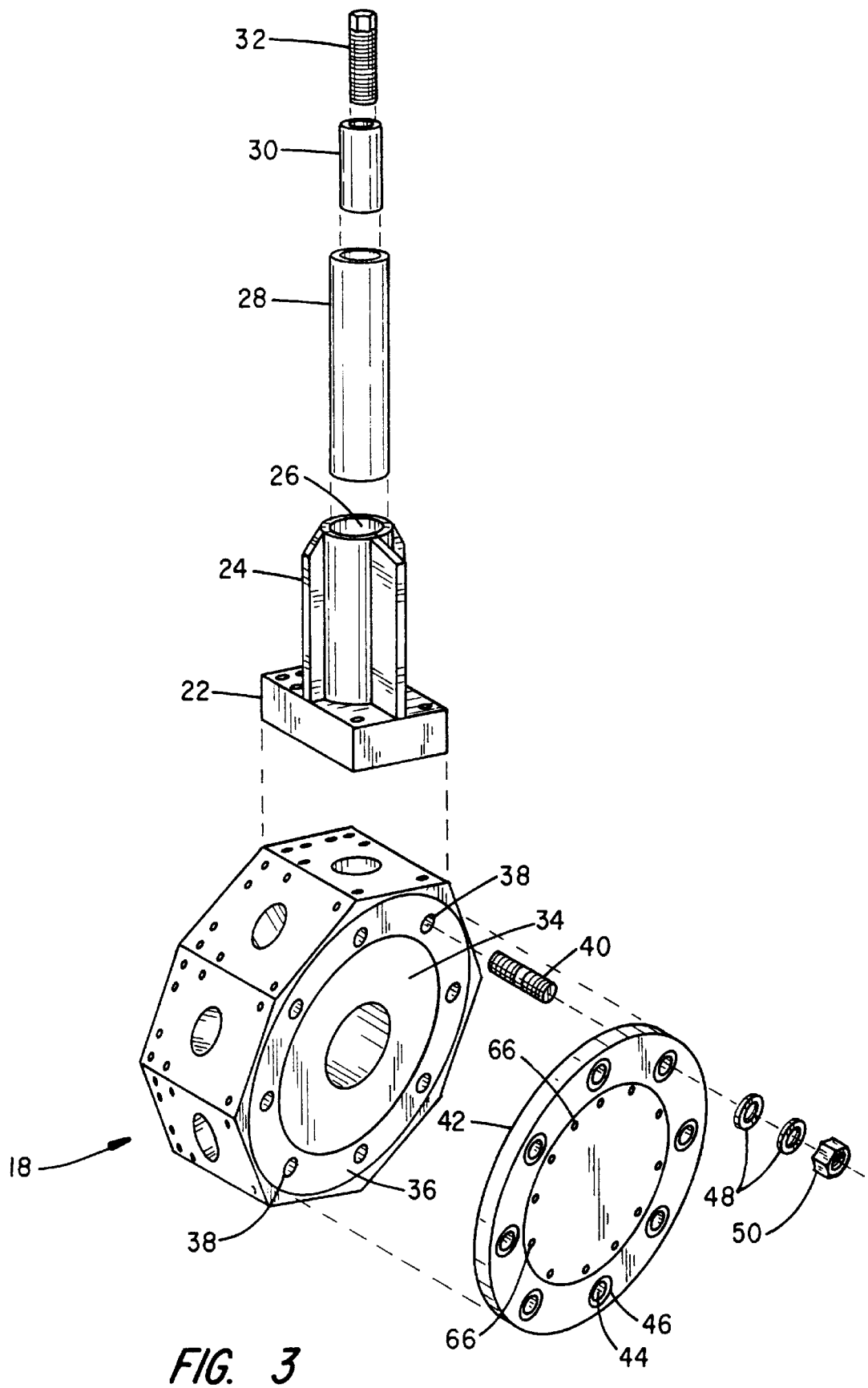
FIG. 3 is an exploded perspective view of a chuck and mounting assembly for mounting the chuck in the internal pipe diameter.

In FIG. 1, there is indicated generally by numeral 10 an end prep facer comprising a preferred embodiment of the present invention. It is shown as being mounted within the I.D. of a pipe component 12 having a flange 14 with a flange face surface 16 to be refurbished. As will be further explained below, it is possible to mount the machine to the O.D. of a pipe flange, as well. The end prep facer 10 is shown in FIG. 1 as concentrically mounted within the internal diameter of the pipe component 12 by means of a chuck 18 (FIG. 3) having an octagonal peripheral surface. Bolted to each of the eight faces is a leg assembly 20 that extends in the radial direction to engage I.D. of the pipe component 12. With reference to FIG. 3, each of the legs 20 comprises an extension block member 22 having a tubular stem portion 24 whose internal bore 26 is sized to receive a tubular bushing 28. The length of the bushing 28 is selected to accommodate pipe components 12 of various sizes and may, for example, come in 5 inch increments up to 15 inches in length. Fitted into the extension bushing 28 is a locator screw bushing 30 having a threaded internal diameter into which a threaded locator screw 32 may be screwed. Thus, as can be seen in FIG. 1, when all eight leg assemblies 20 are affixed to the eight facets of the chuck 18, the locator screws 32 projecting out from the ends of the locator bushings 30 can be adjusted so as to center the chuck 18 relative to the I.D. of the pipe component 12 to be machined.

As seen in FIG. 3, the front face 34 of the chuck 18 is generally planar but includes an arcuate circular groove 36 therein and a plurality of threaded bores 38 are found in the face of the chuck into which threaded studs 40 are screwed. A front miter plate 42 has a plurality of regular spaced bores corresponding in number and spacing to the bores 38 formed in the face 34 of the chuck. Each of the bores 44 is countersunk, as at 46, with a spherical depression for receiving therein spherical washers, as at 48, the spherical washers being placed over the ends of the studs 40 projecting through the front miter plate. Nuts, as at 50, secure the front miter plate to the face of the chuck.

Not visible in the view of FIG. 3 is an annular projection having a rounded contour conforming to the contour of the arcuate groove 36 formed in the chuck's face 34. Using this mounting arrangement, the front miter plate can be tipped or tilted relative to the planar surface of the chuck by selective tightening and loosening of the nuts 50 on their respective studs. The purpose of this miter coupling will be explained in greater detail as the description of the preferred embodiment continues.

In certain applications encountered in the field, a plurality of tubular pipes may terminate in a common flange and in these installations, the end prep machine of the present invention cannot be mounted to the I.D.'s of the individual pipes. There is, therefore, provided a mounting kit for affixing the end prep facer of the present invention to an outside diameter, and this kit is more particularly illustrated in FIG. 4 of the drawings. It comprises a support bracket 21 comprising a weldment of a base plate 23 having a pair of intersecting steel channels 25 and 27 attached to it for strength. Welded to the exterior of the bottom portions of the channels 25 and 27 at each end thereof is a rectangular solid block, as at 29, having a circular bore 31 formed therethrough into which may be fitted an extension tube 33 whose length is dependent upon the size of the flange surface to be refurbished. Affixed to the outer ends of the extension tubes 33 are mounting arms 35. Each of the four mounting arms includes a connector portion 37 in the form of a rectangular block and having a bore 39 formed thereon so that it can be slipped over the end of the tube 33 before bolts 41 are tightened to firmly clamp the block 37 to the extension tube 33. The mounting arms extend over the exterior edges of the flange on which the facer is to be mounted and a further plate (not shown) may be temporarily connected by welding or bolting to join the mounting arm to the reverse side of the flange to be refurbished.

A center shaft 43 which is threaded at each end fits through a longitudinal bore in the mount support bracket and through a central opening of a swivel plate 45 and then into the threaded central bore 47 of a rear miter plate 49. The central opening in the support bracket 21 and the swivel plate 45 are larger in diameter than the O.D. of the center shaft 43, allowing the support bracket and swivel plate to be tilted about the center shaft 43 as an axis.

Located at 90° intervals along the edge of the plate 23 are ears 51 having a threaded bore through the thickness dimension thereof. Set screws (not shown) are threaded through the ears 51 so as to cooperate with rectangular tabs 53 welded to the swivel plate 45. By selective adjustment of the set-screws (not shown), the swivel plate 45 can be shifted laterally over a limited range relative to the support bracket 21, to aid in centering.

Welded to the rear surface of the swivel plate 45 at 90° intervals are stub shafts 55 which extend perpendicularly to the center line of the shaft 43 when assembled through the support bracket 21, the swivel plate 45 and threaded into the miter plate 49. Cooperating with the stub shafts 55 are adjustable couplers indicated generally by numeral 57. The adjustable couplers include a self-aligning bearing 59 that are pressfit into rod end members 61 having a right-hand thread thereon that receives an adjustment nut 63 thereon. Also threaded into the adjustment nut 63 is a lefthand adjustment screw 65. A screw bracket 67 has a threaded bore for mating with the left-hand thread adjustment screw 65. The adjustable coupler thus acts like a turn-buckle.

Figure 2:
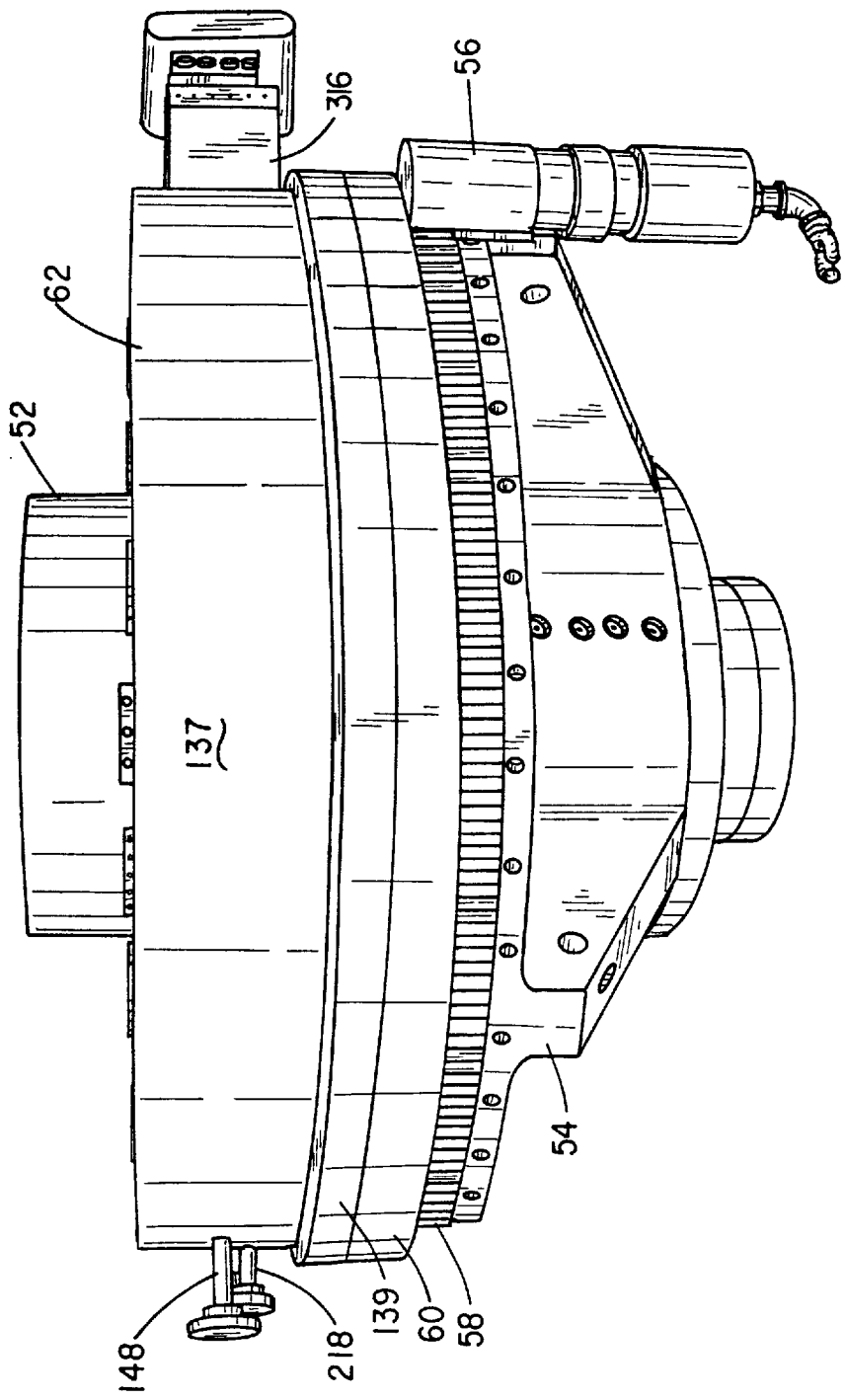
FIG. 2 is a side elevation of the end prep facer demounted from its mounting chuck.

Referring next to FIG. 2, the end prep facer of the present invention is seen to comprise a smooth, polished cylindrical mandrel 52 which passes through the central opening of an annular torque housing member 54. As will be explained in greater detail, the torque housing member 54 can be made to slide longitudinally relative to the mandrel 52, but is prevented from rotating about the mandrel as an axis. Bolted to the torque housing is a drive motor 56. The drive motor may be electric or hydraulic and it has an output shaft with a spur gear mounted on it where the spur gear engages an outer ring gear 58 that is mounted to the underside of a faceplate 60. A shroud or cover forming a part of the bearing housing assembly 62 is bolted to the face plate 60 and is also concentrically mounted with respect to the mandrel 52.

Figure 5:
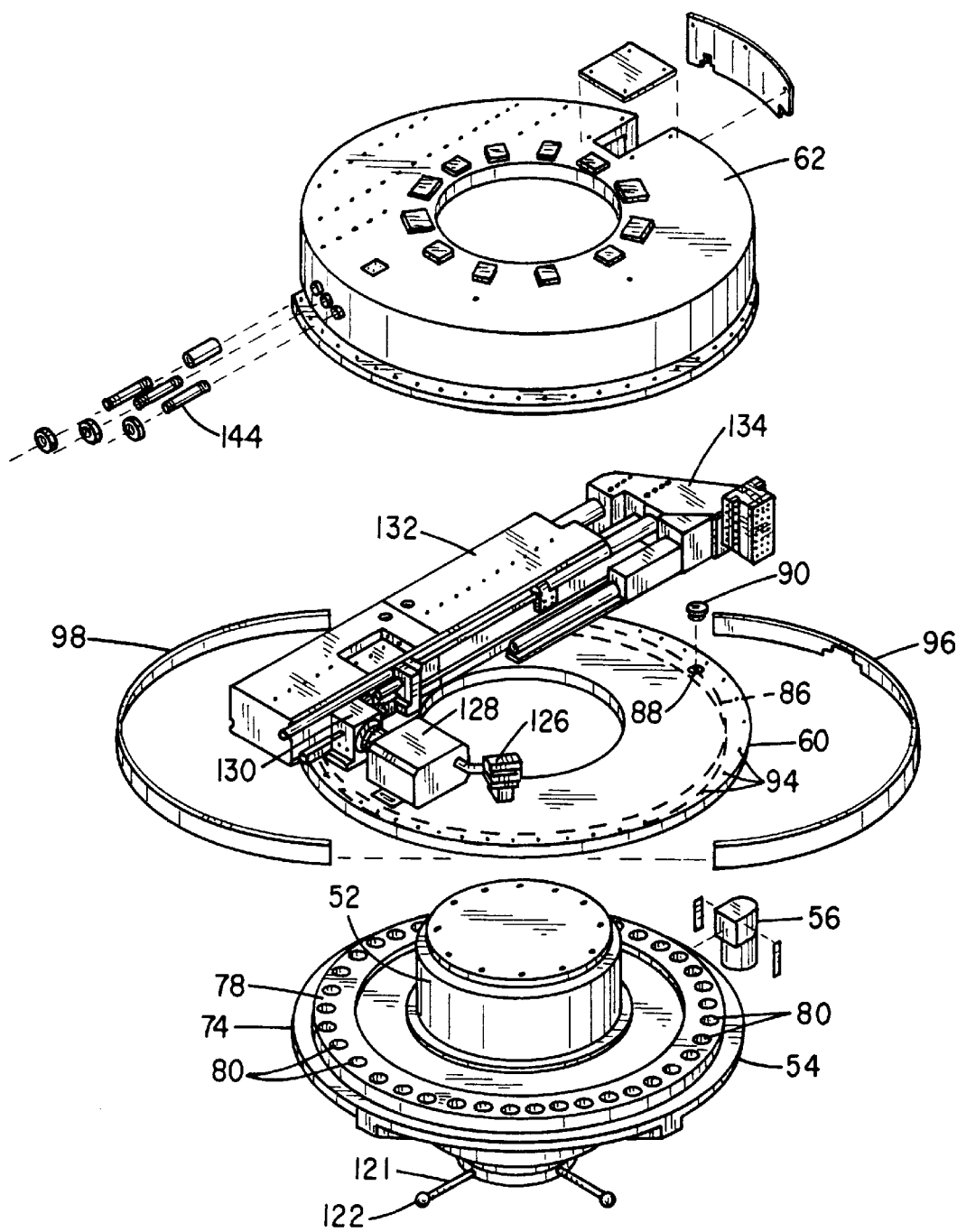
FIG. 5 is an exploded perspective view of the end prep facer showing its major components.
Figure 6:
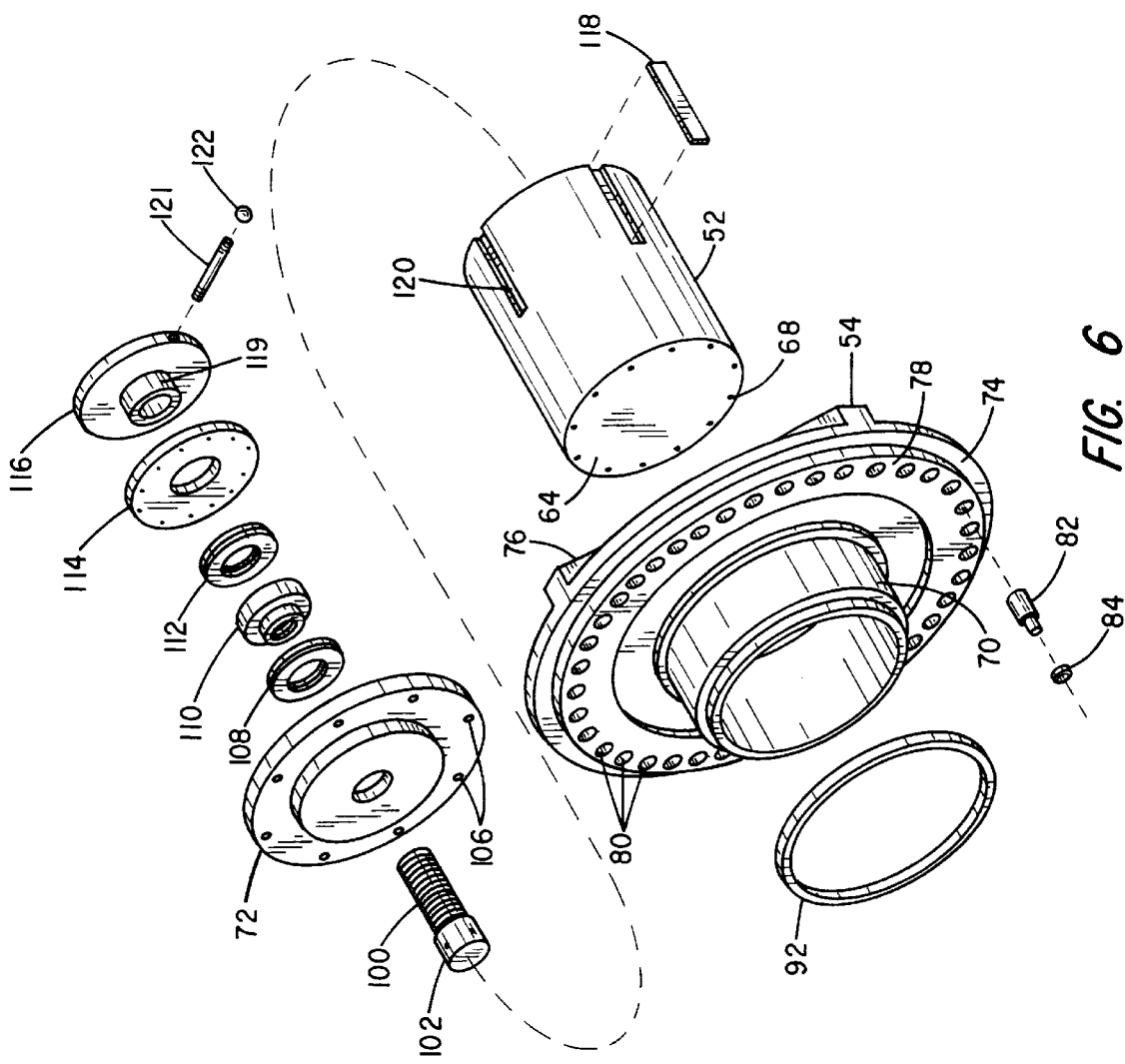
FIG. 6 is an exploded perspective view of the torque housing assembly.

Referring simultaneously to FIGS. 3, 5 and 6, when an I.D. mount is used, the front miter plate 42 is bolted to an end face 64 of the mandrel 52 by bolts not shown passing through bores 66 formed through the miter plate 42 and into threaded bores 68 formed inward of the end face 64 of the mandrel 52. It is apparent, then, that with the miter plate 42 assembled to the chuck and with the mandrel 52 bolted to the miter plate 42, the cylindrical mandrel 52 becomes a stationary member. The torque housing is longitudinally adjustable relative to the mandrel but it is nonrotatable with respect to it. As will, be explained in greater detail, the face plate 60 comprising a part of the bearing housing assembly can be shifted longitudinally with the torque housing and is also able to rotate about the mandrel as a center when driven by the drive motor 56 and its engagement with the outer driving ring gear 58.

Referring to the exploded view of FIG. 6, the construction of the torque housing assembly will be explained. The torque housing assembly includes the torque housing member 54 which, as seen in FIG. 1, comprises a cylindrical portion 70 having a truncated annular conic cap 72 defining a central opening through which the mandrel 52 extends. The cylindrical portion 70 of the torque housing extends outwardly from an exposed face of an annular flange 74 and a series of gussets 76 placed at 90° intervals are used to provide additional structural rigidity to the torque housing members 54.

With continued reference to FIGS. 5 and 6, there is seen on the interface 78 of the flange 74 a series of radially spaced bores 80 that extend around the periphery of the flange 74. Fitted into each of the bores 80 is an eccentric bushing 82 on to which is affixed a roller bearing 84. These roller bearings are adapted to cooperate with an annular race in the form of a groove 86 formed inward of the underside of the face plate 60. The width of the annular groove 86 forming the bearing race is wider than the diameter of the bearing 84 and the eccentric bushings 82 on alternate bearing assemblies are adjusted to cause alternate bearings to ride against the opposite annular walls of the bearing race 86. A threaded aperture 88 (FIG. 5), adapted to be closed by a threaded cap 90, overlays the annular race 86. By removing the cap 90, an operator may view bearing adjustment and operation during assembly. The eccentric bushings 82 may be adjusted so that the bearings 84 will continue to engage the walls of the race 86 following prolonged use and wear through the access ports 81 formed in the torque housing 54.

An inner ring gear 92 is also concentrically disposed about the cylindrical portion 70 of the torque housing and is bolted to the inner face thereof. The outer ring gear 58 is fastened to the undersurface of the face plate 60 and extends around the periphery thereof by fasteners not shown passing through drilled openings 94 and into an upper flat surface of the ring gear. Semicircular shields 96 and 98 enclose the side surfaces of the outer ring gear to prevent entry of foreign objects, such as metal chips between the gear's teeth.

With the I.D. mount of FIG. 3 being used, to longitudinally displace the torque housing 54 relative to the mandrel 52, there is provided a threaded shaft 100 whose head 102 is affixed by screws (not shown) to the rightmost end of the mandrel 52. A rear bearing housing plate 72 slides over the shaft 100 and bolts to the back face of the torque housing 54 by means of bolts (not shown) passing through the drilled bores 106 of the rear bearing plate 72. Fitted over the shaft 100 is a first thrust bearing 108 and threaded on to the shaft is a nut 110. A second thrust bearing 112 helps to minimize longitudinal thrust of the threaded shaft 100. An annular feed bearing cap 114 bolts to the rear bearing plate 72. A hand wheel 116 has an integrally formed annular collar 119 secured to the nut 110 so that rotation of the hand wheel 116 will result in rotation of nut 110 and its movement along the threaded shaft 100 carries the torque housing longitudinally along the surface of the mandrel 52. To prevent rotation of the torque housing 54, four keys 118 are placed at 90° intervals in slots 120 formed in the mandrel. The keys 118 also engage slots (not shown) formed in the inner wall of the cylindrical portion 70 of the torque housing 54. To assist in rotation of the hand wheel 116, four handles, each comprising a shaft 121 and a spherical knob 122, screw into the peripheral edge of the hand wheel 116, again at 90° intervals.

Figure 4:
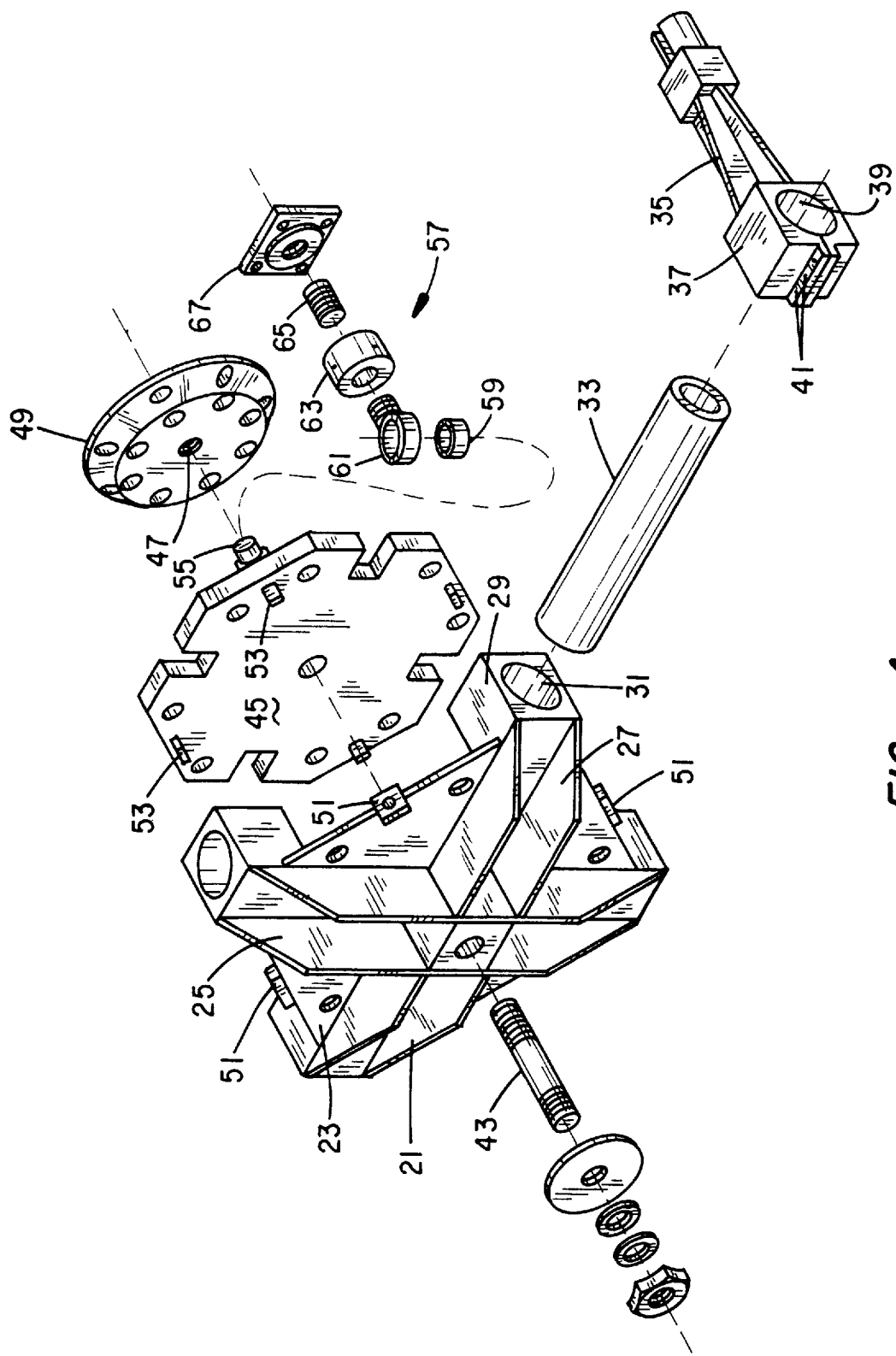
FIG. 4 is an exploded perspective view of the chuck and mounting assembly for affixing the chuck to the outside diameter of the flange to be refaced.

When the O.D. mount kit shown in FIG. 4 is to be used to support the end prep facing machine relative to the work piece, the components evenly numbered between 100–122 are not used, but instead, the rear miter plate 49 of the O.D. mounting kit shown in FIG. 4 is bolted to the mandrel 52 while the screw brackets 67 attach to pad areas 69 (FIG. 1) on the rear portion of the torque housing 54, shown in FIG. 6. Thus, by selective adjustment of the nut 63 and the set screws (not shown) threaded through the ears 51 and cooperating with the tabs 53 on the swivel plate 45, the torque housing assembly, including the mandrel, can be appropriately squared to the piping component to be refurbished.

Figure 7:
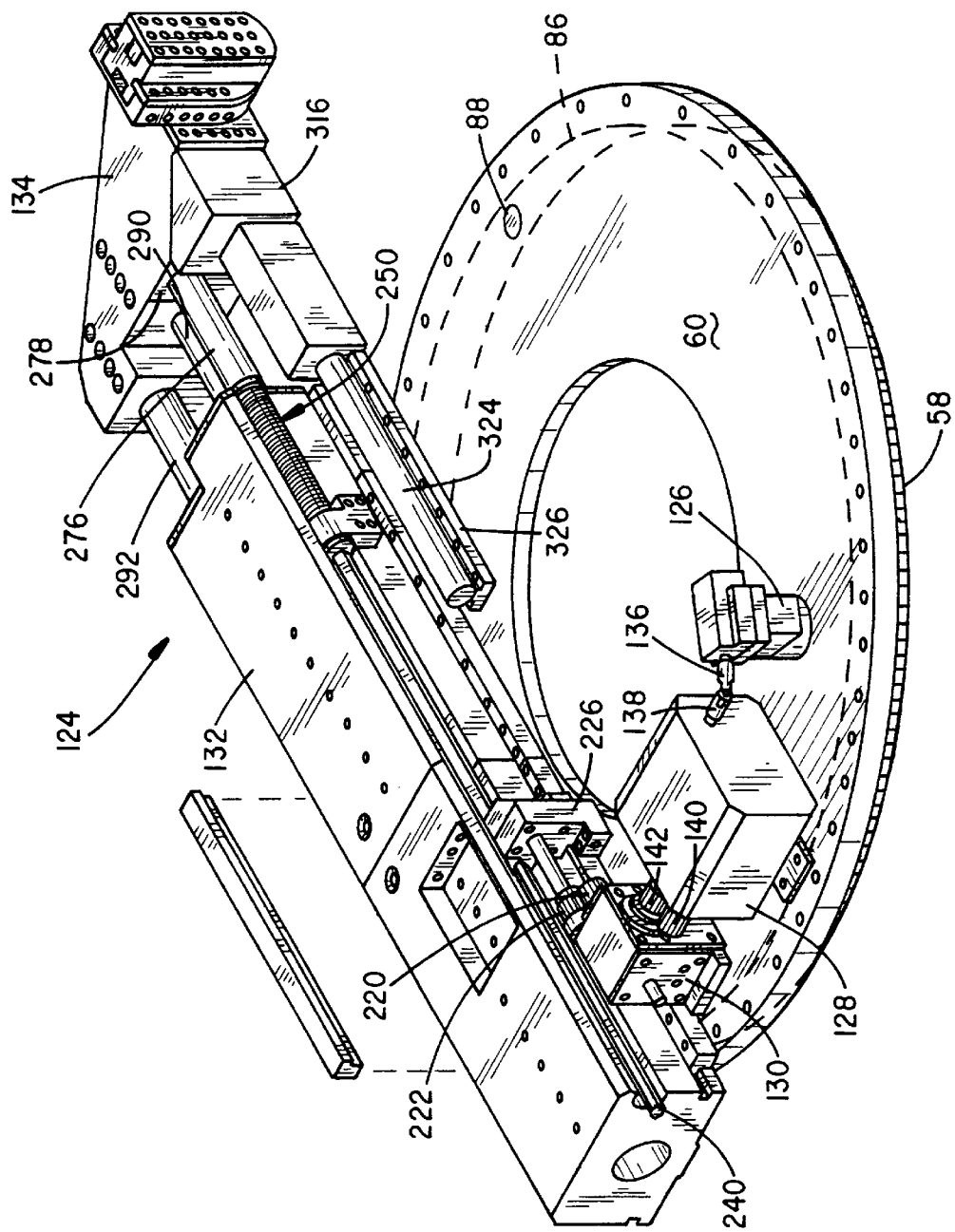
FIG. 7 is a perspective view of the drive assembly portion of the preferred embodiment.

With reference now to FIG. 7, mounted atop the face plate 60 is the drive assembly for translating the cutting tool across the face of the flange being repaired as the face plate 60 and the bearing housing assembly 62 are made to rotate about the mandrel 52. The drive assembly is indicated generally by numeral 124 and includes the face plate 60 to which the outer ring gear 58 is attached. Secured to the opposite side of the face plate from the ring gear 58 is a right angle drive assembly 126, a variable speed gear box 128, a reversing differential gear box 130 and the guide and drive mechanism 132 for the sliding tool head 134.

Figure 8:
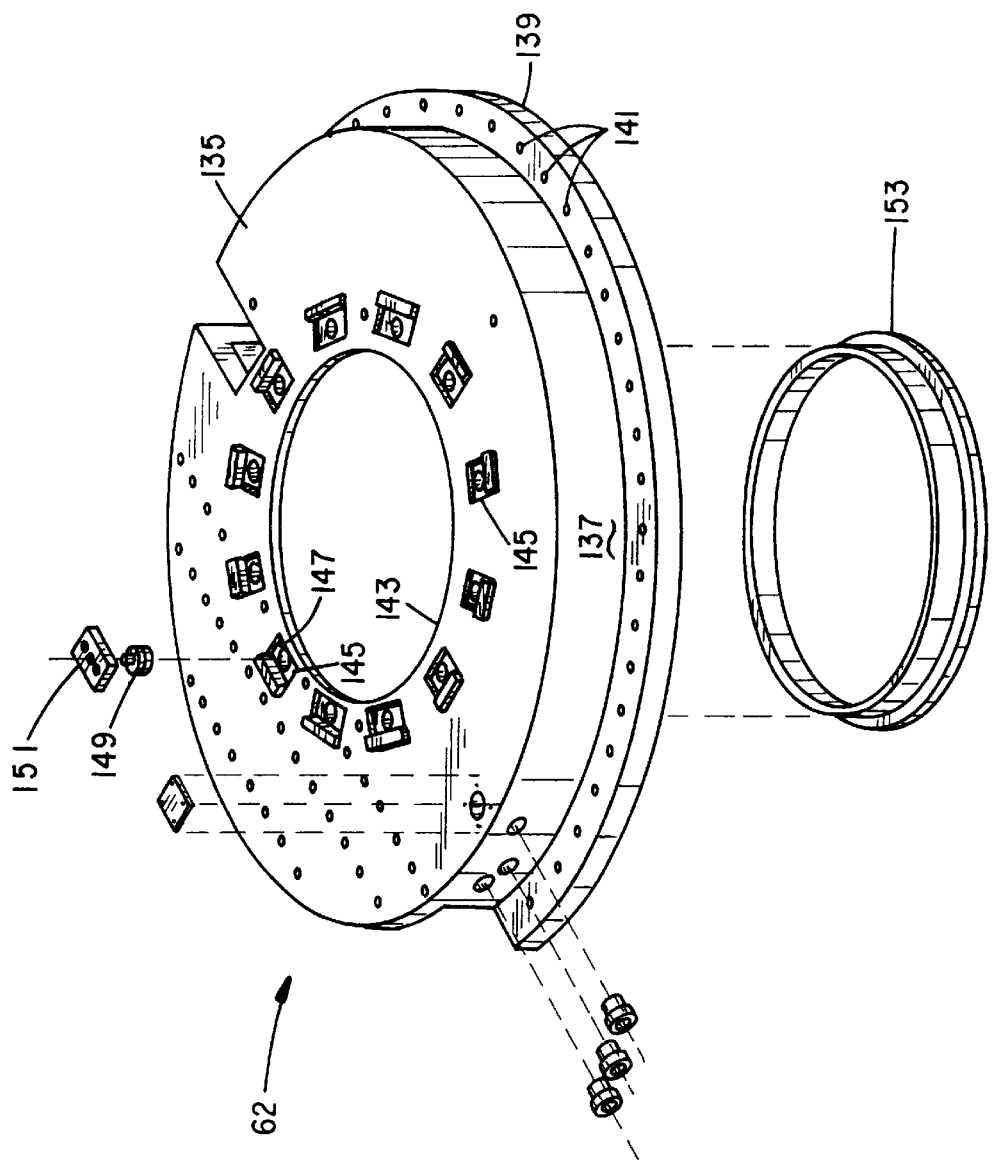
FIG. 8 is an exploded perspective view of the bearing housing assembly.

The bearing housing 62 of FIG. 5 is shown in greater detail in the exploded perspective view of FIG. 8. It is seen to comprise a cylinder having a top plate 135, an annular side wall 137 and a radially extending flange 139 projecting outwardly at the base of the wall 137. A plurality of radially spaced bores 141 are provided in the flange, allowing bolts to pass therethrough for securing the bearing housing assembly 62 to the upper surface of the face plate 60. The top plate 135 has a central opening 143 formed therethrough, allowing the mandrel 52 to extend through it. Extending around the central opening 143 at regularly spaced intervals are rectangular sockets, as at 145, and formed completely through the thickness of the top plate in each of the rectangular sockets is a circular opening 147 into which a Hepco™ bearing 149 is adapted to fit. The shaft of the bearings 149 mount in adjacent plates 151 that are dimensioned to fit into the rectangular sockets 145 and to be bolted in place. Thus, it can be seen that the bearings 149 project downward into the interior of the cover. The bearings cooperate with a spindle bearing race 153 that is dimensioned to fit around the periphery of the mandrel and has an outer peripheral surface shaped to conform to the V-groove on the peripheral face of the Hepco bearings 149. Thus, the bearing race 153 is captured by the bearings 149 and, along with the bearings 84 on the torque housing, journal the cutting head assembly for rotation about the mandrel as an axis. The bearings 149 are fully adjustable in and out to prevent chattering between those bearings and the spindle bearing race 153 following a period of use and wear.

The right angle drive assembly 126 has a shaft extending through an opening in the face plate 60 and affixed to that shaft is a spur gear that is arranged to mesh with the inner drive ring gear 92 that is affixed to the stationary torque housing 54. As the face plate 60 is driven by the drive motor 56, the spur gear on the right angle drive assembly rotates to drive the output shaft 136 which is coupled by a universal joint to an input shaft 138 of the variable speed gear box 128.

Figure 10:
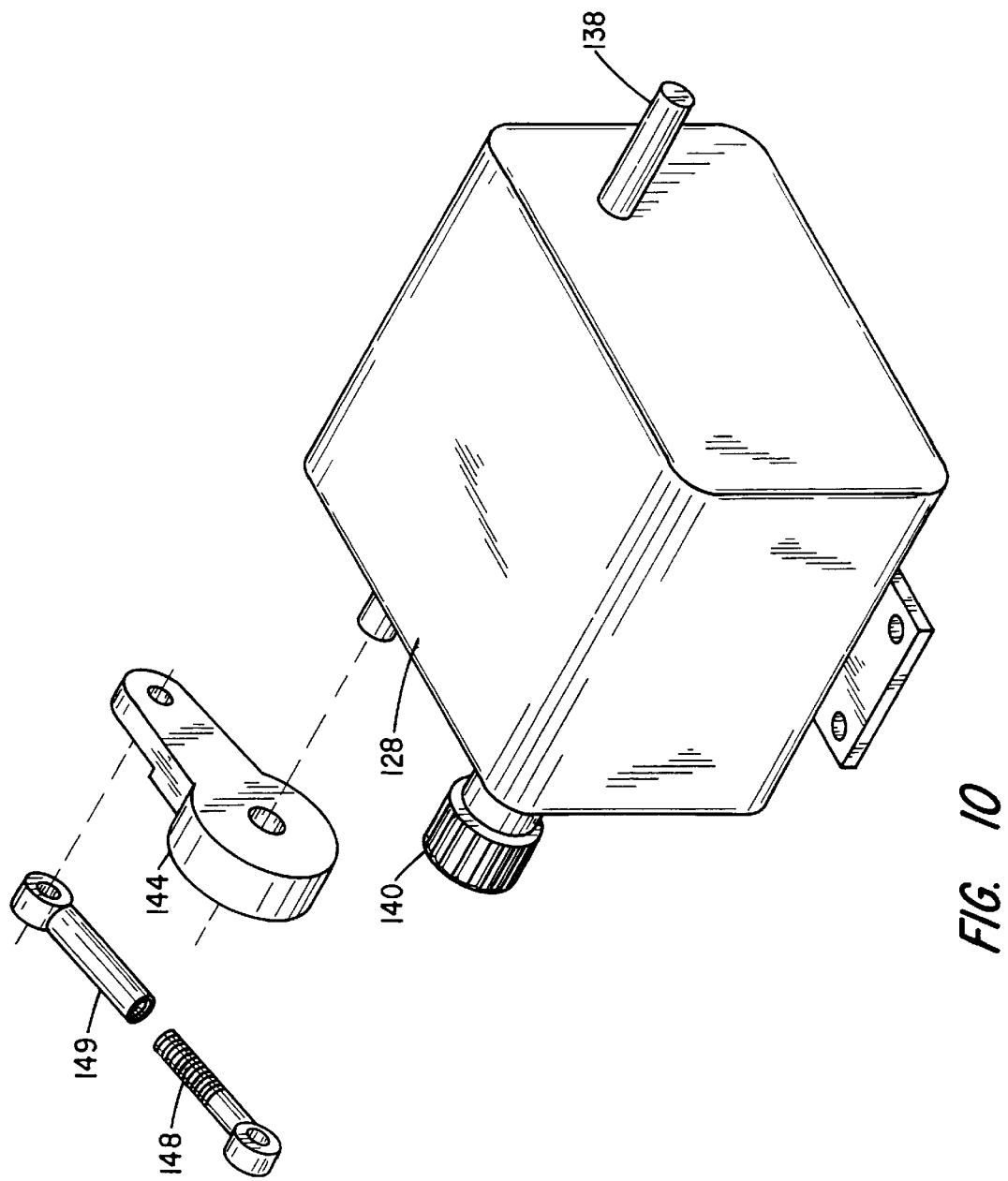
FIG. 10 is an exploded perspective view of the variable speed gear box.

The variable speed gear box used in the preferred embodiment is commercially available from Zero Max, Inc. of Minneapolis, Minn., but limitation to that particular device is not intended. That device functions to vary the speed of its output shaft from 0 rpm to 400 rpm, depending upon the positioning of a control handle. Referring to FIG. 10, the output shaft of the variable speed gear box 128 has a spur gear 140 affixed to it for mating with a similar spur gear 142 affixed to an input shaft of the reversing differential gear box 130. A control arm 144 connects to a control shaft (not shown) on the Zero Max, Inc. variable speed gear box and pivoting of this control arm either increases or decreases the speed of rotation of the spur gear 140, depending upon the direction of movement of the control arm.

With momentary reference back to FIG. 5, a control shaft 144 having a pull knob 146 affixed to its outer end extends through the bearing housing assembly 62 to connect to adjustable length linkage 148 and 149 that is pivotally coupled to the control arm 144. Thus, an operator, by pulling or pushing on the knob 146, may govern the speed at which the input shaft of the reversing differential gear box 130 is driven.

Figure 9:
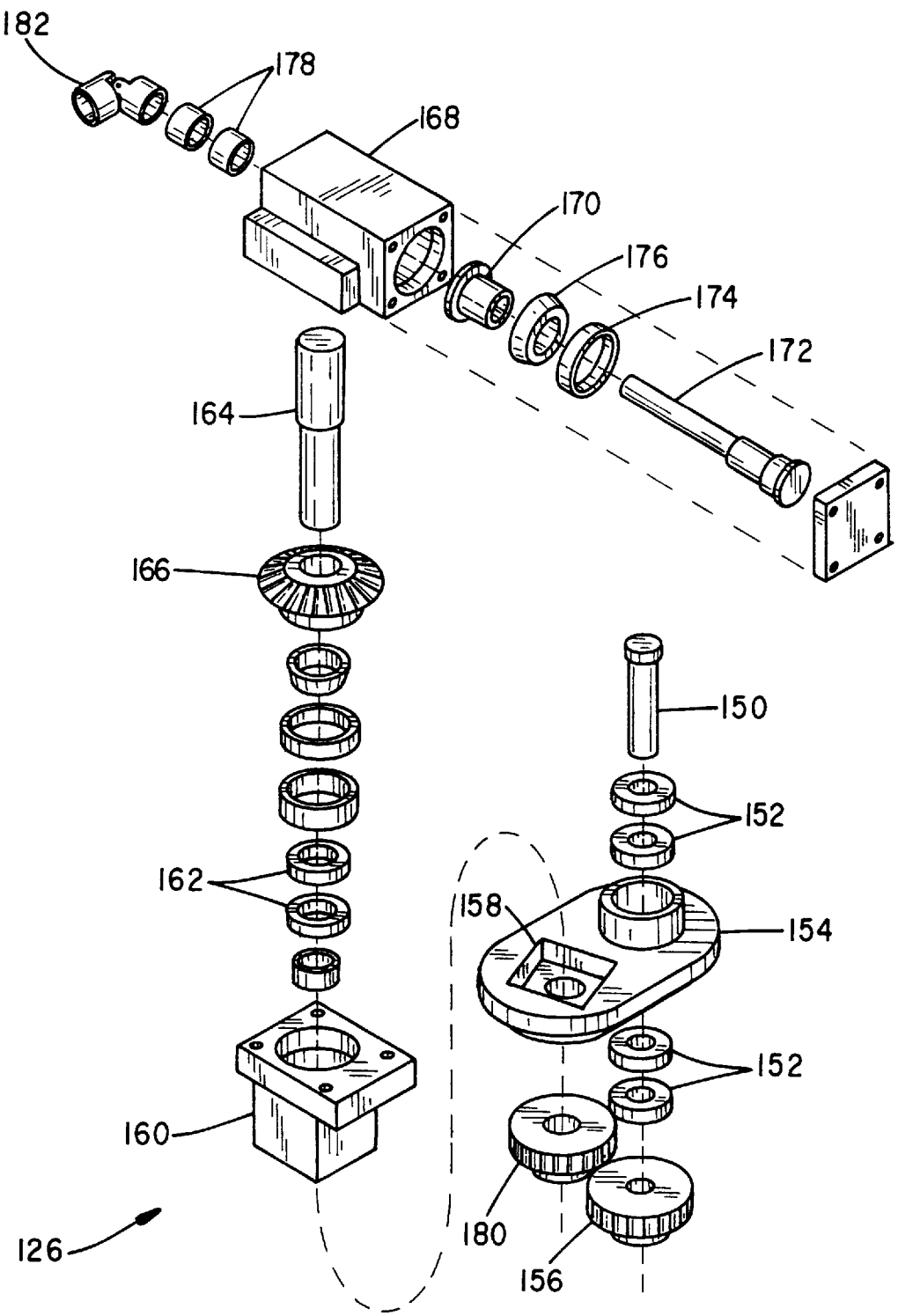
FIG. 9 is an exploded perspective view of the right angle drive gear box.

An exploded view of the right angle drive assembly 126 is illustrated in FIG. 9. It has an idler shaft 150 that is journaled for rotation in sealed bearings 152 disposed in a bearing housing member 154 and the spur gear 156 that mates with the inner ring gear 92 attaches to the lower end of the idler shaft 150. The bearing housing 154 fits into a recess formed in the face plate 60 and it includes a rectangular socket 158 into which fits a gear box base member 160. The gear box base 160 is designed to contain sealed bearings 162 which are used to journal the input shaft 164 of the right angle gear box 126. A bevel gear 166 is attached to the upper end of the input shaft 164 and when the gear box top member 168 is bolted to the gear box base 160, the bevel gear 166 is disposed within the top member 168 to mesh with a second bevel gear 170 affixed to the output shaft 172 of the right angle gear box. The output shaft is journaled for rotation in the gear box top member 168 by means of a bearing cup 174 and an associated bearing cone member 176. The far end of the output shaft 172 is journaled in the gear box top member 168 by sleeve bearings 178. The input shaft 164 is driven by a spur gear 180 that attaches to the lower end of the input shaft 164 projecting out through the bottom of the gear box base 160 and through an aperture formed in the rectangular socket 158 to mesh with the spur gear 156 being driven by the inner ring gear 92. The universal joint coupler 182 for connecting the output shaft 172 of the right angle gear box 126 to the input shaft 138 of the variable speed gear box 128 is also seen in FIG. 9.

Figure 11:
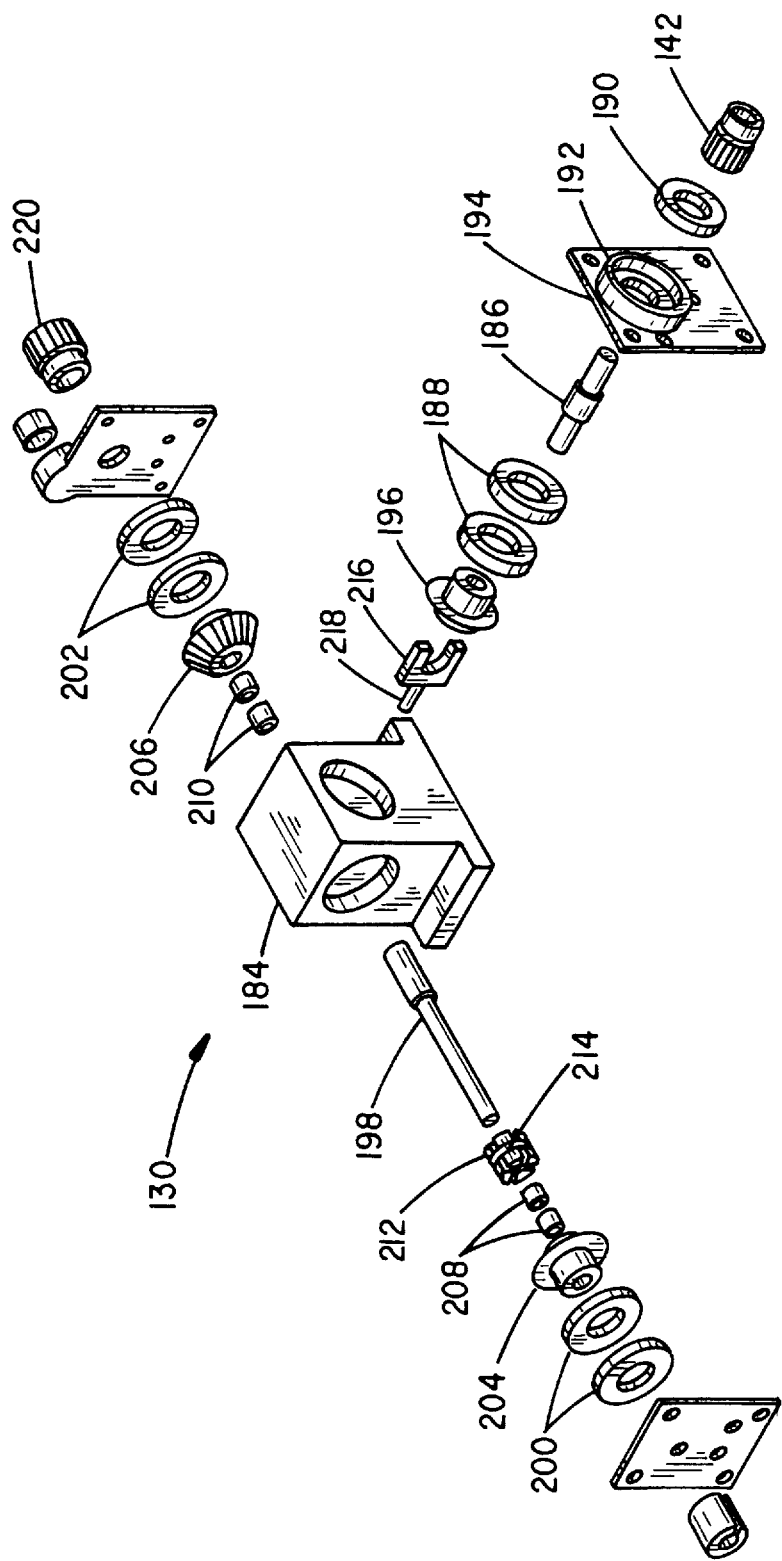
FIG. 11 is an exploded perspective view of the reversing differential gear box.

The details of construction of the reversing differential gear box 130 can be seen in the exploded perspective view of FIG. 11. It comprises a housing 184 having an input shaft 186 journaled for rotation therein by bearings 188 and 190, bearing 190 fitting into an annular collar 192 on a cover plate 194. The spur gear 142 that meshes with the spur gear 140 on the output shaft of the variable speed gear box 128 is affixed to the end of the output shaft 186 and a bevel or miter gear 196 is affixed to its opposite end.

Extending through the reversing differential gear box housing 184 transverse to the output shaft 186 is a reversing shaft 198 that is journaled in the housing by means of bearing sets 200 and 202. A pair of oppositely directed miter gears 204 and 206 are journaled for rotation on the reversing shaft 198 by means of needle bearing sets 208 and 210. The miter gears 204 and 206 at all times mesh and rotate with the miter gear 196 on the input shaft 186.

Keyed to the reversing shaft 198 so as to be slidable longitudinally there along is a reversing clutch member 212. The clutch member 212 has an annular, centrally located groove 214 into which the tines of a shifting fork 216 are adapted to fit. A cylindrical stem 218 of the tuning fork fits through a bore (not shown) formed in the rear side of the reversing differential gear box housing 184 and can be maneuvered by an operator to displace the reversing clutch member 212 along the reversing shaft 198. In operation, as the miter gear 196 drives the clutch gears 204 and 206, one of the gears 204 or 206 will move with a clockwise rotation while the other of the gears 204 and 206 will rotate in a counterclockwise direction. Thus, by manipulating the shifting fork 216 to slide the reversing clutch member 212 in a first direction against one of the gears 204 or 206 that is rotating clockwise, the reversing shaft 198 will also rotate in a clockwise direction. When the shifting fork is manipulated to bring the reversing clutch member 212 into contact with the other of the two bevel gears, the shaft 198 will be made to rotate in the counterclockwise direction. A spur gear 220 is attached to the end of the reversing shaft 198 and is adapted to mesh with a spur gear 222 on a shaft 224 (FIG. 12) of a feed screw gear box 226 forming a part of the guide and drive mechanism 132 for the sliding tool head 134.

Figure 12:
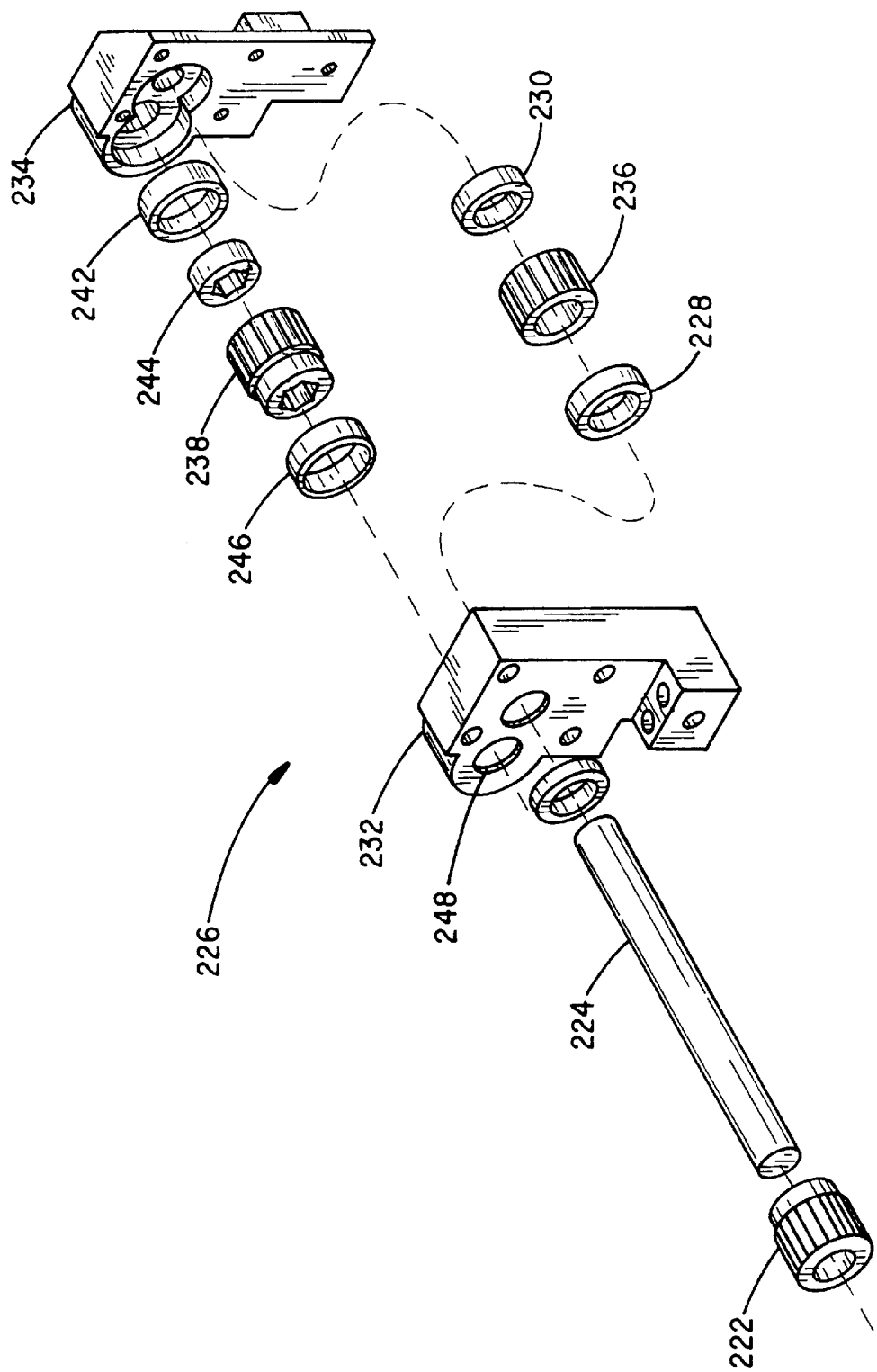
FIG. 12 is an exploded view of the feed screw gear box.

With continued reference to FIG. 12, the shaft 224 is journaled for rotation by bushings 228 and 230 that are disposed in the left hand gear box half 232 and the right hand gear box half 234, respectively. A hubless gear 236 is affixed to the shaft 224 and is designed to mesh with a hex pinion gear 238. Referring to both FIGS. 12 and 14, an elongated shaft of hexagonal cross-section 240 passes through the right-hand gear box half 234 and through a first bushing 242, a further bushing 244 having a hexagonal central opening and through the hex pinion gear 238 and thence through a further bushing 246 so as to extend out through the bore 248 formed through the lefthand gear box half 232. Thus, rotation of the hubless gear 236 on the shaft 224 results in rotation of the hex shaft 240 by virtue of the engagement between the hubless gear 236 and the hex pinion gear 238.

Figure 14:
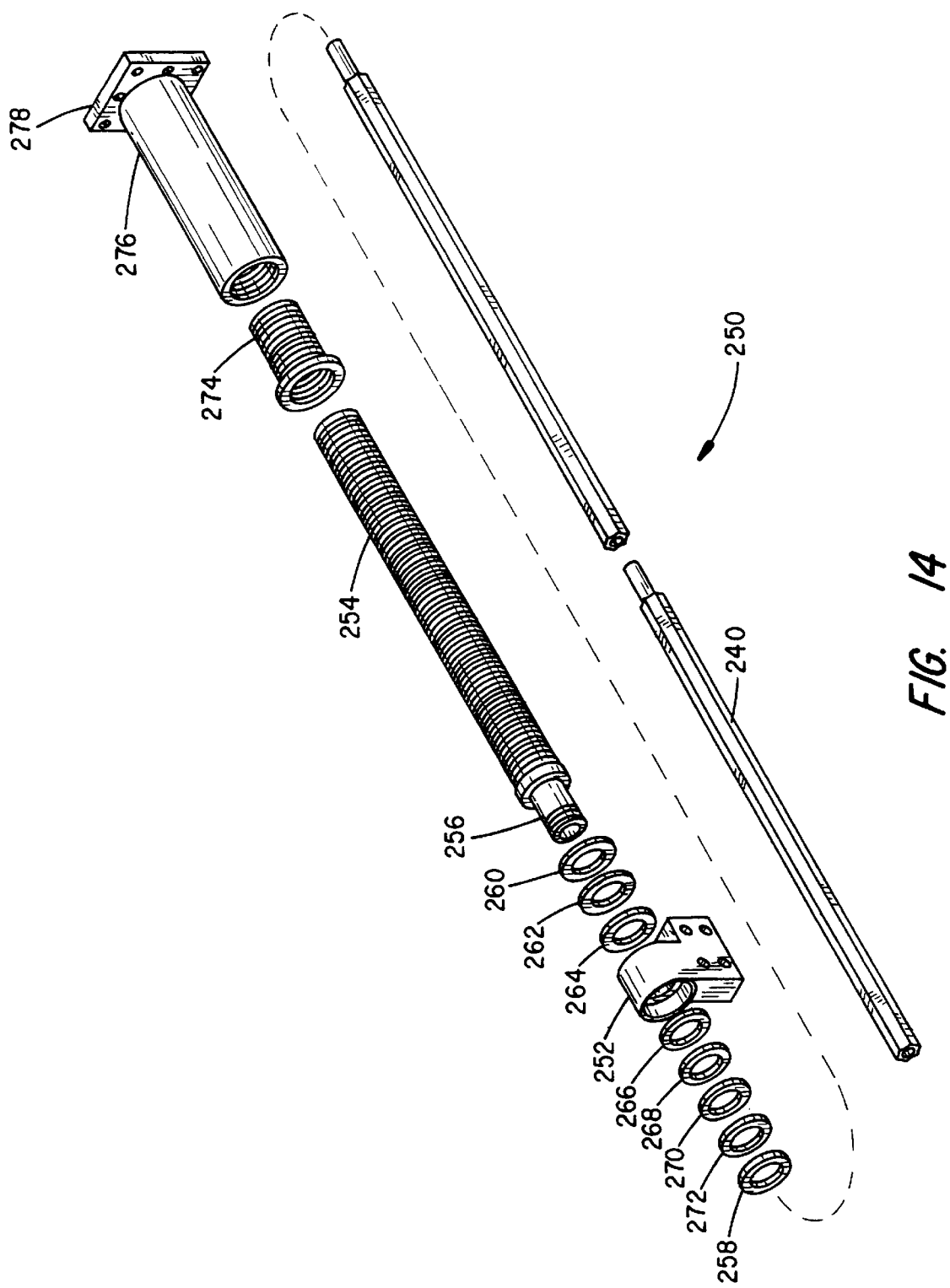
FIG. 14 is an exploded perspective view of the feed screw assembly.

Referring again to FIG. 7, the hex rod 240 forms a part of a feed screw assembly 250 which is depicted in the exploded perspective in FIG. 14. The hex shaft 240 is journaled by the bushings 242, 244 and 246 in the gear box comprised of the halves 232 and 234, but is also supported along its length by virtue of being journaled in a feed screw bearing housing 252. More particularly, and with reference to FIG. 14, a sliding head feed screw 254 has a stub 256 of reduced diameter at the lefthand end thereof, a portion of which is threaded to receive a lock nut 258 thereon. Disposed on the unthreaded portion of the stub 256, in going from right to left, is a thrust washer 260, a thrust bearing 262 and a further thrust washer 264. After passing through the opening in the feed screw bearing housing 252, a further thrust washer 266, a thrust bearing 268, another thrust washer 270 and a lock washer are assembled onto the stub 256 before the lock nut 258 is affixed.

A tubular feed nut 274 is externally threaded to mate with internal threads within a feed nut tube 276. The feed nut tube 276 has a transversely extending rectangular flange 278 that is adapted to be bolted to the sliding tool head 134 as shown in FIG. 7. The feed nut 274 is also internally threaded to mate with the external threads on the feed screw 254. As the hex rod 240 is driven, it carries the sliding head feed screw 254 with it causing the feed nut 274 to move along its threaded exterior and, in doing so, the feed nut carries the sliding tool head 134 with it.

Figure 13:
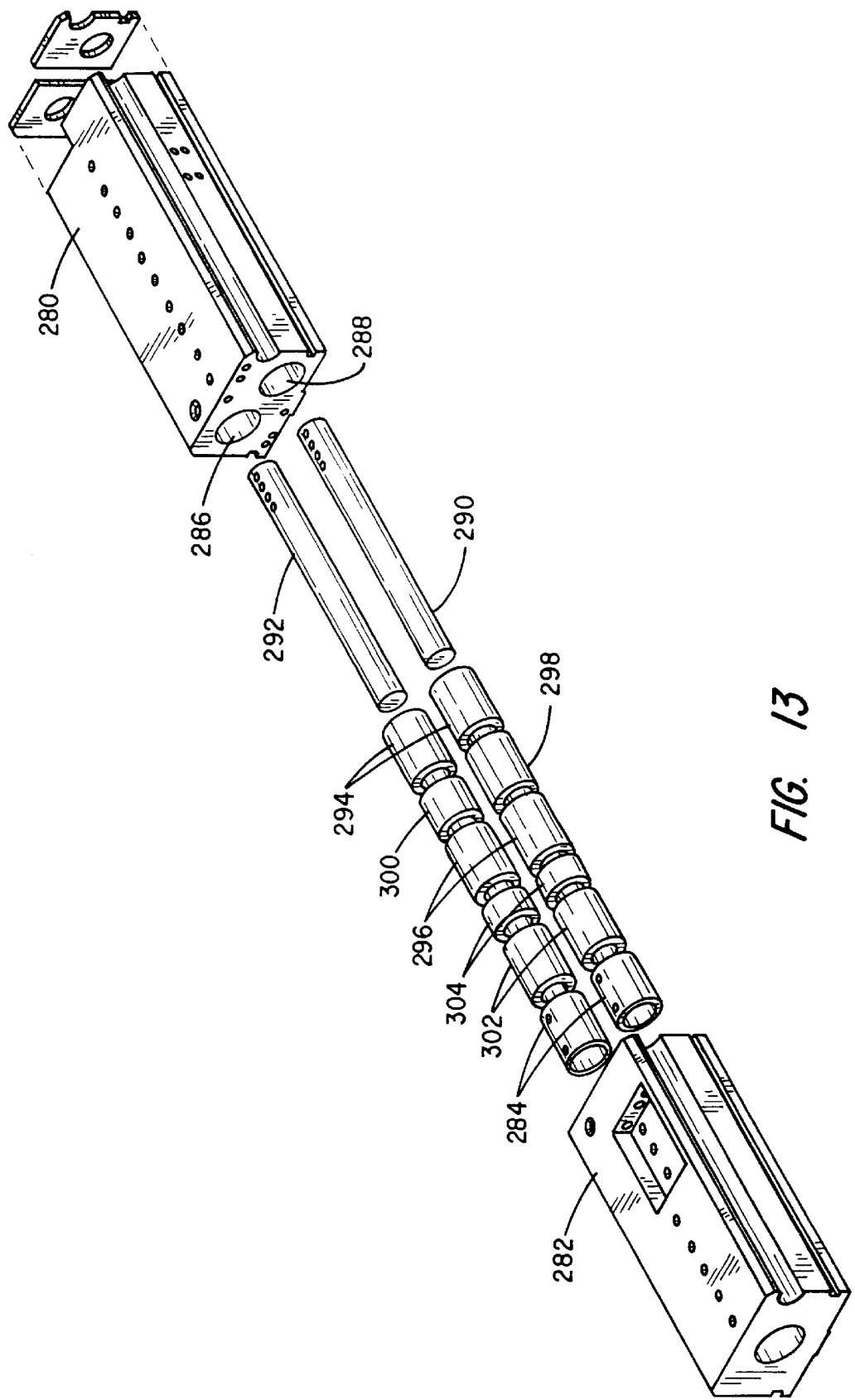
FIG. 13 is an exploded perspective view of the bearing housing assembly.

FIG. 13 provides an exploded perspective view of the guide portion of the guide and drive mechanism 132 of FIG. 7. It is seen to comprise an elongated casting of generally rectangular cross-section that serves as a linear bearing housing 280. Depending upon the size of the piping component to be refaced or machined, a linear bearing housing extender 282 may be joined end-to-end with the housing half 280 by means of coupling bushings 284 which fit into cylindrical bores 286 and 288 formed both in the linear bearing housing 280 and in the mating extension 282. A pair of guide shafts 290 and 292 fit within the elongated bores 286 and 288 and are slidably supported in those bores by three sets of linear bearings that are spaced apart from one another by intermediate tubular spacers. A first set of linear bearings is identified by numeral 294 and a second set by numeral 296 with intermediate spacers 298 and 300. A third set of linear bearings 302 also fit into the bearing housings 280 and are separated from the bearing set 296 by tubular spacers 304.

Figure 15:
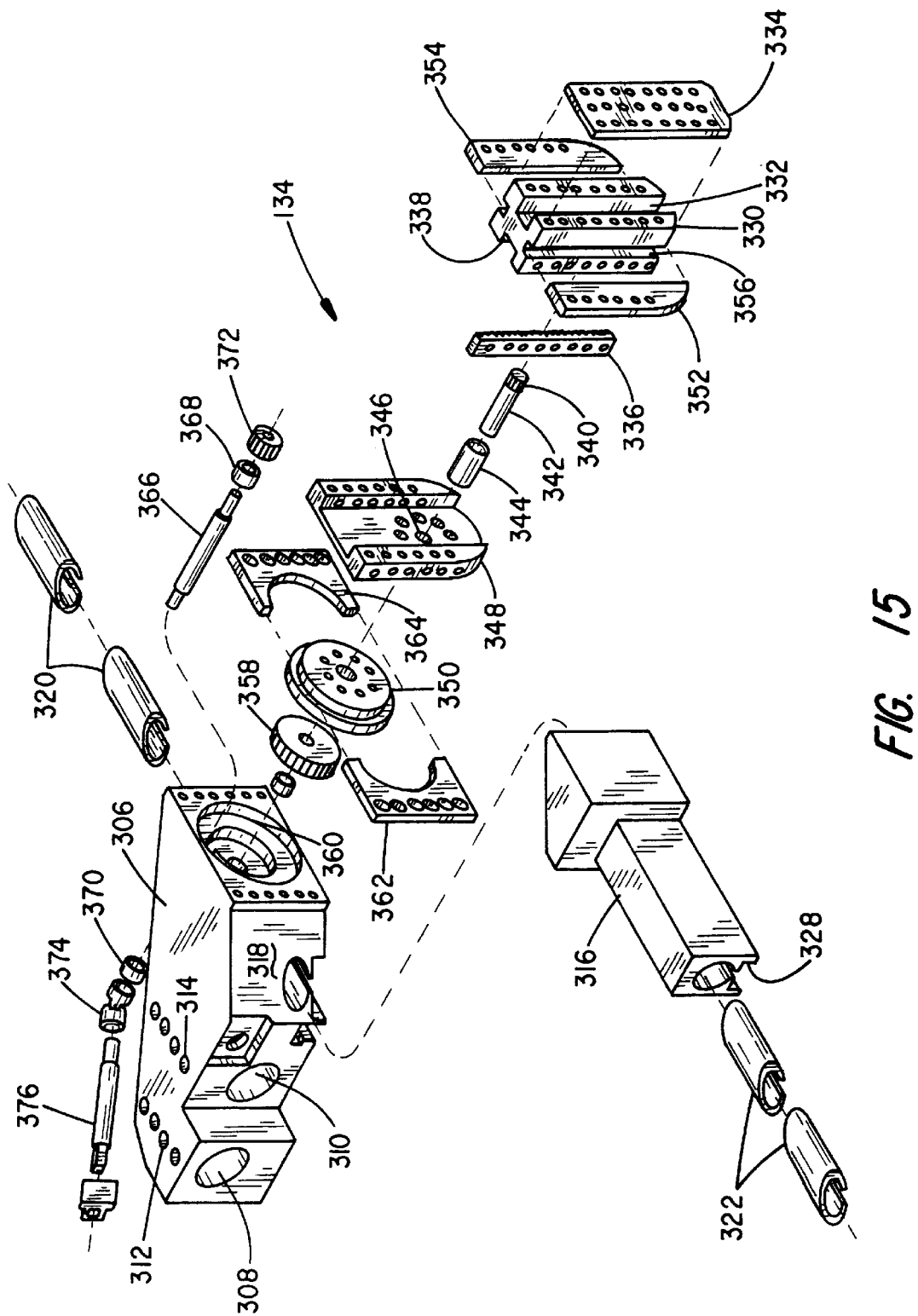
FIG. 15 is an exploded view of the sliding tool head and tool bit holder.

As seen in FIG. 7, the free ends of the guide shafts 290 and 292 attach to the tool slide head 134. The details of construction of the tool slide head are illustrated in the exploded perspective view of FIG. 15. The sliding head assembly 134 comprises a head member 306 having a pair of parallel bores 308 and 310 for receiving the ends of the guide rods 292 and 290, respectively, therein. Screws (not shown) are inserted into threaded bores as at 312 and 314 to secure the head 306 to the guide rods. Depending upon the size of the piping component being worked on, an optional sliding head extension member 316 may be used to provide additional stability to the sliding tool head 306. The sliding head extension 316 is adapted to be bolted to the beveled surface 318 of the sliding head member 306 and linear bearings 320 and 322 are provided for providing smooth sliding engagement with an outboard support shaft 324 (FIG. 7). The cylindrical shaft 324 includes a base portion 326 that gets bolted to the face plate 60 and which enters a guideway slot 328 formed in the extension member 316.

The tool block 330 has a channel 332 formed therein for receiving a tool bit (not shown). The tool bit is clamped in place in the channel when a cap plate 334 is bolted on to the tool block. A gear rack fits into a further channel 338 on the rear side of the tool block 330 and its teeth are arranged to mesh with pinion gear teeth 340 ground on the end of a pinion stem member 342. The pinion stem fits through a bushing 344 that fits into an aperture 346 formed centrally in a swivel head member 348 and through the central opening of a swivel head base member 350 to which the swivel head 348 is bolted. The tool block 330 is arranged to slide up and down with respect to the swivel head member 348. More particularly, first and second gibs 352 and 354 are slidingly received within opposed side channels 356 formed in the tool block 332 and the gibs, in turn, are fastened to the swivel head member 348. When the pinion stem 342 is rotated, it cooperates with the rack teeth on member 336 to raise and lower the tool block 332 relative to the swivel head member 348, depending upon the direction of rotation of the pinion stem 342.

The pinion stem 342 has a pinion gear 358 keyed to the end thereof and the gear 358 along with the swivel head base 350 are adapted to fit within a cavity 360 formed in the face of the sliding head member 306. A pair of swivel head keeper plates 362 and 364 capture the swivel head base 350 within the cavity 360 when the keeper plates are bolted to the sliding head member 306. When the screws holding the keeper plates to the sliding head member are somewhat loose, it is possible to swivel or rotate the tool block 330 and the swivel head 348 to which it is affixed to a desired angular orientation before the screws holding the keeper plates to the sliding head member 306 are tightened so as to clamp and hold that desired angular position. By providing the ability to both swivel and translate the tool block 330, the device of the present invention is capable of performing O.D. turning, flange face grooving, beveling or boring.

The sliding head block 306 includes a further cylindrical bore (not shown) therethrough in which a tool block feed shaft 366 is journaled for rotation. The shaft is journaled in a pair of bushings 368 and 370 and a pinion gear 372 is affixed to an end thereof for meshing with the pinion gear 358 affixed to the pinion stem member 342. The tool block feed shaft 366 is adapted to be rotated through a universal joint 374 that couples the tool block feed shaft 366 to an extension shaft 376.

It can be seen from the foregoing description of the preferred embodiment that the end prep facer of the present invention can be mounted either to the I.D. or O.D. of a pipe component whose flange is to be machined and because of the adjustability features built into the mounting kits (FIGS. 3 and 4). The mounting chuck can be readily centered with respect to the longitudinal axis of the pipe component. Once the chuck is so positioned, a crane or forklift may be used to move the cutting head assembly of FIG. 5 on to the chuck with the threaded studs 40 extending through the front miter plate 42. By selective adjustment of the mounting bolts 50, the miter plate 42 can be skewed appropriately so that the cutting tool disposed in the tool block 332 of FIG. 15 will traverse a locus of points in a plane generally parallel to the surface of the flange of the piping component to be refurbished. Then, by rotation of the hand wheel 120, a course adjustment of the tool bit can be made to bring it into close proximity to the flange.

Now, by energizing the drive motor 56, the face plate 60 and bearing housing 62 bolted thereto will rotate about the mandrel or spindle 52 as a center. As the face plate rotates, the spur gear 156 on the right angle drive assembly 126 will mate with the rotating inner ring gear 92 and thus will be driven. As previously described, the speed of rotation of the output shaft of the right angle drive 126 can be multiplied by the variable speed gear box 128 and, further, the direction of rotation of the lead screw 250 can be set by selective manipulation of the shifting fork 216 forming a part of the reversing gear box 130.

This causes the sliding tool head 134 to move in or out depending upon the direction of rotation of the lead screw 250. Manual adjustment of the shaft 376 (FIG. 15) may move the tool bit against the flange surface. As the tool block and cutting tool traverse the flange, metal is removed therefrom and periodically the operator may further rotate the shaft 376 to thereby translate the tool block 332 relative to the swivel head 348 and, in doing so, adjust the depth of cut for the next pass.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. An end prep facer for refurbishing piping components, comprising in combination:

(a) a chuck having a plurality of equally spaced, radially extending legs of adjustable length adapted to support the chuck at a center point of a tubular piping component to be refurbished;

(b) a cylindrical mandrel of a predetermined outer diameter affixed to said chuck;

(c) a torque housing comprising a cylindrical tube having an inner diameter slightly greater than the predetermined outer diameter of the mandrel and mounted in concentric relation on the mandrel for longitudinal displacement there along, the torque housing having a first ring gear concentric with the cylindrical tube and a plurality of roller bearings mounted thereon;

(d) means operatively coupled between the mandrel and the torque housing for adjusting the portion of the torque housing along a longitudinal axis of the mandrel;

(e) a cutting head assembly including an annular face plate with first and second major surfaces, the first major surface having an annular groove forming a bearing race thereon for engaging the plurality of roller bearings of the torque housing and a second ring gear concentric with the bearing race, the second major surface of the face plate supporting a variable speed reversible drive assembly thereon;

(f) a drive motor mounted on the torque housing, the drive motor having an output shaft with a driving gear thereon for engaging the second ring gear for rotating the cutting head assembly relative to the torque housing assembly about the cylindrical mandrel as a center;

(g) a tool support guide member affixed to the second major surface of the annular face plate, the tool support guide member having a lead screw mounted therein and coupled in driven relation to the variable speed, reversible drive assembly; and (h) a sliding head member operatively coupled to the lead screw and movable therewith in a direction transverse to the longitudinal axis of the mandrel, the sliding head member supporting a tool bit holder.

2. The end prep facer as in claim 1 and further including:

(a) means cooperating with the sliding head member for manipulating the positioning of the tool bit holder.

3. The end prep facer as in claim 2 wherein the means for manipulating comprises means for translating and means for rotating the tool bit holder.

4. The end prep facer as in claim 1 wherein the radially extending legs engage an internal diameter of the piping component to be refurbished.

5. The end prep facer as in claim 1 wherein the radially extending legs engage an external surface of the piping component to be refurbished.

6. The end prep facer of claim 1 and further including an annular protective shroud having a cover plate with a central opening for receiving a portion of the cylindrical mandrel therethrough with a plurality of roller bearings affixed to an underside of the cover plate and disposed at regular spaced intervals around the central opening, the plurality of roller bearings engaging an annular bearing race disposed about the cylindrical mandrel.

7. The end prep facer of claim 1 wherein the tool support guide member comprises:

(a) a bearing housing block having first and second longitudinal bores formed therethrough;

(b) linear sleeve bearings disposed in the first and second longitudinal bores in the bearing housing block;

(c) first and second elongated guide shafts slidably disposed within the linear sleeve bearings; and (d) the lead screw being journaled for rotation in a channel formed longitudinally in the bearing housing block.

8. The end prep facer as in claim 1 wherein said roller bearings comprise a stub shaft and a roller eccentrically mounted on said stub shaft such that rotation of the stub shaft repositions the roller relative to the groove forming the annular bearing race.

9. The end prep facer of claim 6 wherein the plurality of roller bearings affixed to the underside of the cover plate are adjustable in and out relative to the cover plate.

10. An end prep facer for refurbishing piping components, comprising in combination:

(a) a chuck having a plurality of equally spaced, radially extending legs of adjustable length adapted to support the chuck at a center point of a tubular piping component to be refurbished;

(b) a cylindrical mandrel of a predetermined outer diameter affixed to said chuck;

(c) a torque housing comprising a cylindrical tube having an inner diameter slightly greater than the predetermined outer diameter of the mandrel and mounted in concentric relation on the mandrel for longitudinal displacement there along, the torque housing having a radial flange portion with a plurality of cylindrical, longitudinal bores formed in a face of the flange portion at uniformly spaced circumferential intervals proximate the periphery thereof with roller bearings mounted in the cylindrical longitudinal bores and a first ring gear affixed to the face of the flange portion concentric with the cylindrical tube;

(d) manually operable feed screw means operatively coupled between the mandrel and the torque housing for adjusting the portion of the torque housing along a longitudinal axis of the mandrel;

(e) a cutting head assembly including an annular face plate with first and second major surfaces, the first major surface having an annular bearing race thereon for engaging the roller bearings of the torque housing and a second ring gear concentric with the bearing race, the second major surface of the face plate supporting a right angled drive device, said right angle drive device having a drive gear meshing with the first ring gear and an output shaft; coupled to a variable speed gear box, the variable speed gear box being mounted on the second major surface of the face plate;

(f) a variable speed gear box assembly affixed to the second major surface of the face plate, said variable speed gear box having an input shaft driven from the output shaft of the right angle drive device and an output shaft;

(g) a reversing differential gear box affixed to the second major surface of the face plate having first and second input shafts and an output shaft with the first input shaft of the reversing differential gear box being driven from the output shaft of the variable speed gear box assembly;

(h) a drive motor mounted on the torque housing, the drive motor having an output shaft with a driving gear thereon for engaging the second ring gear for rotating the cutting head assembly relative to the torque housing assembly about the mandrel as a center;

(i) a tool support guide member affixed to the second major surface of the annular face plate, the tool support guide member having a lead screw mounted therein and coupled in driven relation to the output shaft of the reversing differential gear box; and (j) a sliding head member operatively coupled to the lead screw and movable therewith in a direction transverse to the longitudinal axis of the mandrel, the sliding head member supporting a tool bit holder.

11. The end prep facer as in claim 10 wherein the reversing differential gear box includes:

(a) selector means for effecting clockwise, counterclockwise or no rotation of the lead screw mounted in the tool support guide member.

12. The end prep facer as in claim 10 and further including:

(a) means cooperating with the sliding head member for manipulating the positioning of the tool bit holder.

13. The end prep facer as in claim 12 wherein the means for manipulating comprises means for translating and means for rotating the tool bit holder.

14. The end prep facer as in claim 10 wherein the radially extending legs engage an internal diameter of the piping component to be refurbished.

15. The end prep facer as in claim 10 wherein the radially extending legs engage an external surface of the piping component to be refurbished.

16. The end prep facer of claim 10 and further including:

(a) an annular protective shroud affixed to said annular face plate in covering relation to said right angle drive device, said variable speed gear box assembly said reversing differential gear box and said tool support guide member.

17. The end prep facer of claim 16 wherein the annular protective shroud includes a cover plate having a central opening for receiving a portion of the cylindrical mandrel therethrough with a plurality of roller bearings affixed to an underside of the cover plate and disposed at regular spaced intervals around the central opening, the plurality of roller bearings engaging an annular bearing race disposed about the cylindrical mandrel.

18. The end prep facer of claim 10 wherein the tool support guide member comprises:

(a) a bearing housing block having first and second longitudinal bores formed therethrough;

(b) linear sleeve bearings disposed in the first and second longitudinal bores in the bearing housing block;

(c) first and second elongated guide shafts slidably disposed within the linear sleeve bearings; and (d) the lead screw being journaled for rotation in a channel formed longitudinally in the bearing housing block.

19. The end prep facer of claim 10 and further including: means for adjusting an angle between a longitudinal axis of the mandrel and a predetermined face surface of the chuck.

20. The end prep facer of claim 19 wherein the means for adjusting the angle comprises:

a miter plate affixed to one end of the mandrel, the miter plate having an annular beveled protuberance projecting outward from a surface of the miter plate for cooperating with an annular beveled recess formed inwardly on the face surface of the chuck, and a plurality of bolts passing through the miter plate into the face surface of the chuck, the bolts being individually adjustable to effect tilting of the miter plate relative to the face surface of the chuck.

* * * * *